(No Model.)

J. J. CARROLL.
DECORATED PLATE GLASS.

No. 293,947. Patented Feb. 19, 1884.

Witnesses:
A. E. Eader
J. Edw. Morris.

Inventor:
Jas. J. Carroll
By Chas. B. Mann
Attorney.

UNITED STATES PATENT OFFICE.

JAMES J. CARROLL, OF BALTIMORE, MARYLAND.

DECORATED PLATE-GLASS.

SPECIFICATION forming part of Letters Patent No. 293,947, dated February 19, 1884.

Application filed November 13, 1883. (No model.)

*To all whom it may concern:*

Be it known that I, JAMES J. CARROLL, a citizen of the United States, residing at Baltimore, State of Maryland, have invented certain new and useful Improvements in Decorated Plate-Glass, of which the following is a specification.

My invention relates, first, to an improved article of plate-glass for the decoration of walls and ceilings of houses, panels of furniture, cars, and such uses; and, second, to a new method of producing the said article, as hereinafter set forth.

Figure 1:
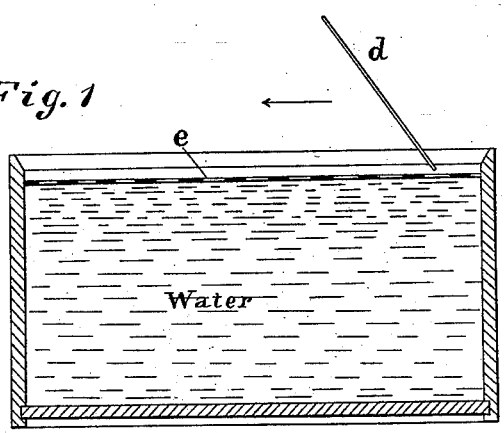
Figure 2:
Figure 3:
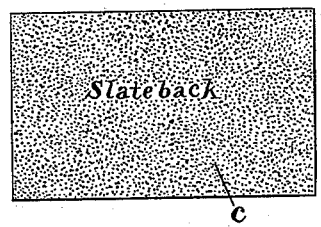
Figure 4:
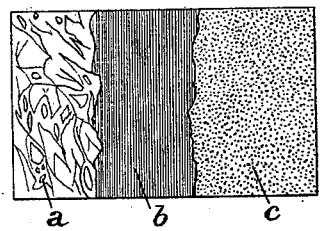

The invention is illustrated in the accompanying drawings, in which Figure 1 shows the water-tank, having the colors $e$ floating on the surface of the water. Fig. 2 shows the outer face of the glass ornamented in imitation of marble. Fig. 3 shows the glass having the slate backing $c$, which covers and protects the colors. Fig. 4 represents a plate of glass, showing a portion of its back finished—that is, covered with slate $c$—a portion with the background $b$ exposed, and a portion with the ornamenting-colors $a$ exposed.

The selection of the colors is a matter of taste and judgment, and the same may be readily done by any one conversant with the manufacture of marbleized-slate mantels. The colors are to be first mixed in oil, and then spread on the surface of water contained in a tub or tank. A mixture of oil and varnish is then also put on the surface of the water and distributed among the colors. This mixture, having no affinity for the colors, causes them to break or separate into blotches, connected by streaks resembling the veins of marble. This result is facilitated by means of a flat pointed stick, whereby the floating colors may be manipulated and distributed; and a fan may sometimes be advantageously employed to prevent the colors from bunching or huddling together. When the colors have been disposed or mixed to the desired point, a glass plate is immersed into the mixture in the following manner: The glass plate $d$, (see Fig. 1,) being held with its surface in an inclined position, is lowered so that its lowermost edge will enter the colors, and then, as the lowering is continued into the water, a lateral movement over the surface of floating colors is also given the plates in the direction indicated by the arrow in Fig. 1, by which operation the lowermost inclined surface of the glass is covered with the colors $a$, disposed in veins resembling marble. The plate is then placed in an oven heated to about 160° to 175° Fahrenheit, and there allowed to remain about twelve hours, which fixes the colors. A background, $b$, of oil-colors is then applied with a brush, and the glass plate is again placed in the oven heated to the temperature before named, and baked, as before. A back protecting covering, $c$, of slate, is then applied over the colors. This is effected as follows: A plastic composition, embracing two parts linseed-oil, five parts varnish, and three parts pulverized slate-dust, is applied with a brush. As the composition is setting, and while it is yet sticky, as much pulverized slate-dust is sprinkled over the sticky back surface as will adhere. When the back will take no more, the glass plate is again placed in the baking-oven and allowed to remain about twelve hours, for the purpose of baking or hardening the composition. This completes the method.

The temperature of the oven, the duration of time named for baking, and the proportion of parts comprising the slate composition may be varied from that herein given without materially affecting the result and without departing from the essence of my invention.

The protecting-covering is essentially a concrete slate, and I claim a slate back, when applied over a colored or painted glass plate, as of the essence of my invention, even though it be applied in a different manner from that here given. Such backs protect the colors thoroughly, rendering the same proof against the effects of dampness or water, and overcoming all liability to injury from heat. The ornamenting-colors will remain permanent, and will not crack or peel.

Glass plate thus ornamented has many advantages. It may be readily cut to fit any place where a marble panel could be used, is adapted for numerous uses, and is a cheap substitute for marble where decoration is the desideratum.

Having described my invention, I claim—

1. As a new article, plate-glass ornamented with colors, and having a back or protecting covering of slate, substantially as set forth.

2. The method of producing plate-glass ornamented with colors, consisting in applying the colors to one surface of the glass, then applying over the colors a plastic composition embracing slate-dust, and finally hardening the composition, as set forth.

3. The method of producing plate-glass ornamented with colors, consisting in distributing oil-mixed colors on the surface of water, immersing a glass plate into the water, so as to have the colors adhere to one surface of the plate, and then covering the colored surface with slate, as set forth.

In testimony whereof I affix my signature in presence of two witnesses.

JAS. J. CARROLL.

Witnesses:
J. EDW. MORRIS,
JNO. T. MADDOX.